Patented Oct. 4, 1932

1,880,930

UNITED STATES PATENT OFFICE

ERNST ELBEL AND FRITZ SEEBACH, OF ERKNER, NEAR BERLIN, GERMANY, ASSIGNORS TO BAKELITE GESELLSCHAFT MIT BESCHRANKTER HAFTUNG, OF BERLIN, GERMANY

METHOD OF LACQUERING AND IMPREGNATING WITH ARTIFICIAL RESINS

No Drawing. Application filed July 25, 1928, Serial No. 295,343, and in Germany August 15, 1927.

The present invention relates to a method of lacquering and impregnating porous or fibrous materials with artificial resins, and to the products thereof.

It is known that porous materials, especially fabrics such as paper sheets, are lacquered or impregnated with solutions of phenol-formaldehyde condensation products in volatile solvents, as for instance methyl alcohol. When lacquering fibrous sheets (cotton, cellulose, paper, carton, cardboard and the like) with a spirit solution of an artificial resin, such as hardenable or unhardenable phenol-formaldehyde condensation products, or with acetaldehyde phenol condensation products, cumaron resins and other artificial resins, complete permeation of the fibrous sheet is not obtained; rather, the coating of artificial resin-lacquer stays mainly on the side to which it is applied.

The present invention permits the attainment of a complete permeation of porous materials or substances, especially fibrous sheets. The method consists in introducing the artificial resins, in a state of colloidal dispersion, in fatty drying oils into the fibrous sheets or into the porous body.

This invention may be carried out by comminuting the artificial resin, together with linseed oil varnish, in a mill such as a ball mill or colloid mill, until the particles can no longer be detected when rubbed between the fingers. The varnish obtained is then applied on the material to be lacquered or impregnated, for example, by brushing or spraying it on. The material to be impregnated, or lacquered, may advantageously be placed in vacuo and the liquid introduced under pressure. The quantity of the artificial resin to be applied or added, as well as the proportion of the oil, should be in accordance with the desired thickness of the lacquer layer or with the degree of impregnation desired.

If the properties of the artificial resin are of particular importance, more artificial resin is employed than if the qualities of the oil varnish are to be stressed.

All kinds of phenol-formaldehyde condensation products can be used as artificial resins, those condensed with acids, bases, as well as acid or basic-acting substances; also the artificial resins purified according to the German Patents 431,514, 432,202, 432,203, 432,727. The latter may be very easily, quickly and completely dispersed. Hardenable as well as unhardenable artificial resins may be employed and if unhardenable artificial resins (Novolaks) are used, one can add thereto, in any manner, a hardening agent as for instance polymerized formaldehyde or hexamethylene-tetramine. Various artificial resins may be employed, for example, mixtures of hardenable, unhardenable, and also of natural resins. Five to ten parts by weight (based on the weight of resin) of organic solvents such as hexalin and acetone, which cause the resin to swell or help to obtain, or retain, the fine comminution, may be added.

As fatty oils can be used, linseed oil and linseed oil varnish, wood oil, "Standoel", "Uvioloil", and mixtures of different oils, substances such as zinc oxide, magnesium oxide (hydroxide) or calcium oxide (hydroxide) may be added to the finished varnishes.

"Standoel" is a polymerized oil obtained by boiling a fatty oil. "Uvioloil" is a fatty oil which is polymerized by the action of ultra-violet rays.

One method of carrying out this invention is to apply the artificial resin and the fatty oil separately on, or into, the paper, the porous material, or the fibrous sheet. This may be done in such a way that the finely comminuted artificial resin is first applied to the material to be impregnated, as for example by applying the dry or wet, finely divided ground artificial resin, evaporating any liquids, then applying the fatty oil. By using pressure or vacuum, the oil can be absorbed. The process may also be reversed by applying the oil first and then the artificial resin. One may also apply the artificial resin with an organic solvent or mixed with small quantities thereof and let the solvent evaporate.

The resin can also be used as a mixture with the fibrous materials, for example, by mixing the fiber in a "hollander" or the like with the artificial resin, and then fabricating the fiber into sheets on paper or cardboard machines. Here about 5% or more resin can be employed. The resinous sheet thus produced is brushed or sprayed with oil and may then be subjected to vacuum. After application of the oil, it may be heated.

The material to be impregnated, or the fibrous sheet, may also be sprayed on one side with the artificial resin, or it may be brushed or impregnated with a solution of the artificial resin in organic solvents, and the oil applied on the other side, employing either pressure or vacuum.

One may also alternate by thoroughly impregnating both sides of one sheet with a spirit-artificial resin-lacquer and both sides of another sheet, for example, with an oil varnish or wood oil. Homogeneity of these constantly alternating layers is achieved in the hardening process since interdiffusion takes place to a surprising degree of perfection as is shown by the great uniformity of the finished product.

One can also produce fabrics from two lots of fibrous material, of which one lot is impregnated with artificial resin-lacquer, the other with an oil-varnish, and then the finished fabric compacted by heat or pressure, or by both.

For the purpose of drying, the sheet may be treated with air which may be heated if necessary or exposed to an ozonized atmosphere, or exposed to light of a short-wave length. The hardening is done at temperatures of 130 to 160°.

Instead of fibrous sheets, manufactured fibrous material may be employed, as for example wires which are covered with fibrous materials.

Fibrous sheets treated according to this invention, such as papers and the like, are remarkable for their elasticity and insulating properties; their use as molding material being most important. They are very gas-tight. In this form, they may be used as liners for condensers or for the winding of bobbins, of low and high tension transmissions, and the like. The impregnated paper may be fabricated in the usual manner into cardboard products, when its elasticity gives it substantial advantages.

The distribution of the artificial resin in oil may also be obtained by adding pieces of the artificial resin to the oil and then injecting superheated steam for a shorter or longer time. The oil mixed with crushed artificial resin may pass in a continuous stream through an apparatus in which the mixture is treated with superheated steam and on leaving immediately cooled.

The mixtures of artificial resin and fatty oils may be produced by working hardenable or unhardenable artificial resin and about the double quantity or more of the fatty oil in a mill as described above.

We claim:

1. A method of lacquering and impregnating porous and fibrous sheets with solid hardenable artificial resins, which comprises applying to such sheets said resins in a finely comminuted condition and drying oils.

2. A method of lacquering and impregnating porous and fibrous sheets with solid hardenable artificial resins, which comprises applying to such sheets liquids consisting of the said resins in a finely comminuted condition and drying oils.

3. A method of lacquering and impregnating porous and fibrous sheets with solid hardenable artificial resins, which comprises successively applying to such sheets said resins in a finely comminuted state, and drying oils.

4. A method of impregnating fibrous sheets with solid hardenable artificial resins, which comprises superposing a plurality of fibrous sheets which have been alternately treated with said resins in a finely comminuted state, and drying oil, and subjecting the superposed sheets to pressure.

5. A method of impregnating fibrous sheets with solid hardenable artificial resins, which comprises superposing a plurality of fibrous sheets which have been alternately treated with said resins in a finely comminuted state, and drying oil, and subjecting the superposed sheets to heat and pressure.

6. As a new article of manufacture, fibrous sheets impregnated with a solid hardenable artificial resin and a drying oil in the absence of a solvent.

7. As a new article of manufacture, a laminated structure comprising fibrous sheets impregnated with a solid hardenable artificial resin and a drying oil in the absence of a solvent.

8. As a new article of manufacture, fibrous sheets impregnated with a liquid consisting of solid hardenable artificial resins in a finely comminuted state and drying oils.

9. As a new article of manufacture, a laminated structure comprising fibrous sheets impregnated with a liquid consisting of solid hardenable artificial resins in a finely comminuted state and drying oils.

In testimony whereof, we affix our signatures.

ERNST ELBEL.
FRITZ SEEBACH.